United States Patent
Rainer

(10) Patent No.: US 12,448,326 B2
(45) Date of Patent: Oct. 21, 2025

(54) METHOD FOR MARKING GLASS PANELS, PREFERABLY SINGLE-PANE SAFETY GLASS PANELS

(71) Applicant: HEGLA boraident GmbH & Co. KG, Beverungen (DE)

(72) Inventor: Thomas Rainer, Wernigerode (DE)

(73) Assignee: HEGLA boraident GmbH & Co. KG, Beverungen (DE)

( * ) Notice: Subject to any disclaimer, the term of this patent is extended or adjusted under 35 U.S.C. 154(b) by 1373 days.

(21) Appl. No.: 17/044,542

(22) PCT Filed: Apr. 5, 2019

(86) PCT No.: PCT/EP2019/058725
§ 371 (c)(1),
(2) Date: Oct. 1, 2020

(87) PCT Pub. No.: WO2019/214884
PCT Pub. Date: Nov. 14, 2019

(65) Prior Publication Data
US 2021/0107828 A1    Apr. 15, 2021

(30) Foreign Application Priority Data
May 8, 2018    (DE) .......... 102018207181.0

(51) Int. Cl.
C03C 23/00    (2006.01)
B41M 5/24    (2006.01)
B41M 5/26    (2006.01)
C03C 17/32    (2006.01)
C03C 17/38    (2006.01)

(52) U.S. Cl.
CPC .......... *C03C 23/0025* (2013.01); *B41M 5/24* (2013.01); *B41M 5/262* (2013.01); *C03C 17/32* (2013.01); *C03C 17/38* (2013.01); *C03C 2218/328* (2013.01); *C03C 2218/355* (2013.01)

(58) Field of Classification Search
CPC ..... C03C 23/0025; C03C 17/32; C03C 17/38; C03C 2218/328; C03C 2218/355; C03C 17/34; C03C 17/36; B41M 5/24; B41M 5/262
See application file for complete search history.

(56) References Cited

U.S. PATENT DOCUMENTS

| 2003/0039765 A1 | 2/2003 | Hayakawa et al. |
| 2016/0169531 A1* | 6/2016 | Wagner ............. B32B 5/142 |
| | | 264/400 |
| 2019/0019736 A1* | 1/2019 | Schrauben ........... H05K 3/046 |

FOREIGN PATENT DOCUMENTS

| DE | 10258522 A1 | 7/2004 |
| DE | 10351226 A1 | 6/2005 |
| DE | 102005025982 A1 | 12/2006 |

(Continued)

OTHER PUBLICATIONS

PCT Application No. PCT/EP2019/058725: English Translation of International Preliminary Report on Patentability dated May 8, 2020 mailed Nov. 12, 2020 (8 pages).

(Continued)

*Primary Examiner* — James M Mellott
(74) *Attorney, Agent, or Firm* — Dickinson Wright PLLC

(57) ABSTRACT

Methods for marking glass sheets, preferably single-pane safety glass sheets.

19 Claims, 2 Drawing Sheets

(56) References Cited

FOREIGN PATENT DOCUMENTS

| | | | |
|---|---|---|---|
| DE | 102005026038 A1 | 12/2006 | |
| EP | 3031785 A1 * | 6/2016 | ............ B23K 26/352 |

OTHER PUBLICATIONS

WO App. No. PCT/EP2019/058725: International Search Report and translation, Oct. 1, 2019 (10 pages).

WO App. No. PCT/EP2019/058725: Written Opinion dated Nov. 14, 2019 (11 pages).

Translation of title of DIN EN 12151-1:2015-12, 1 page (Dec. 2015).

Translation of title of DIN EN 12150-1:2015-12, 1 page (Dec. 2015).

\* cited by examiner

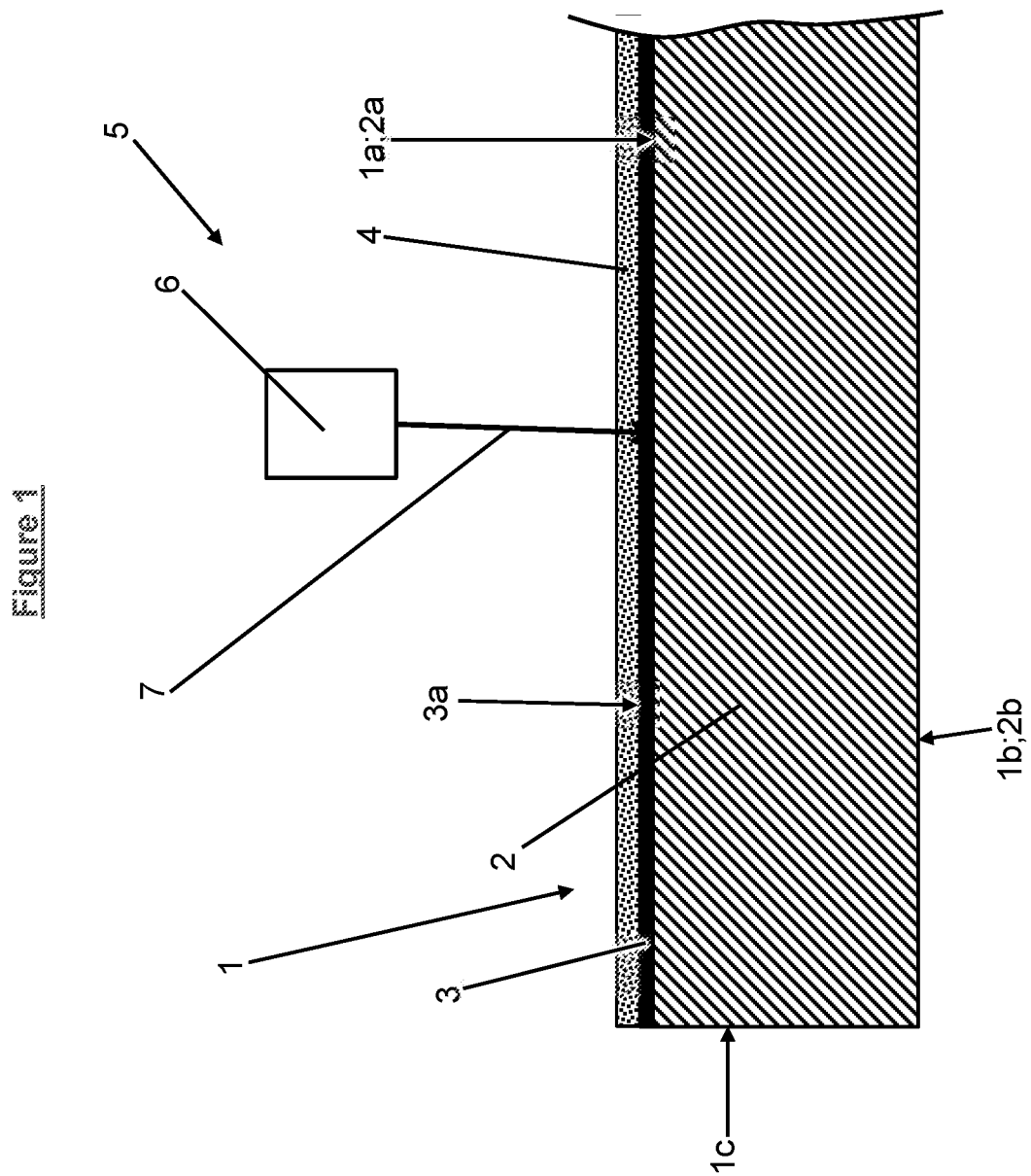

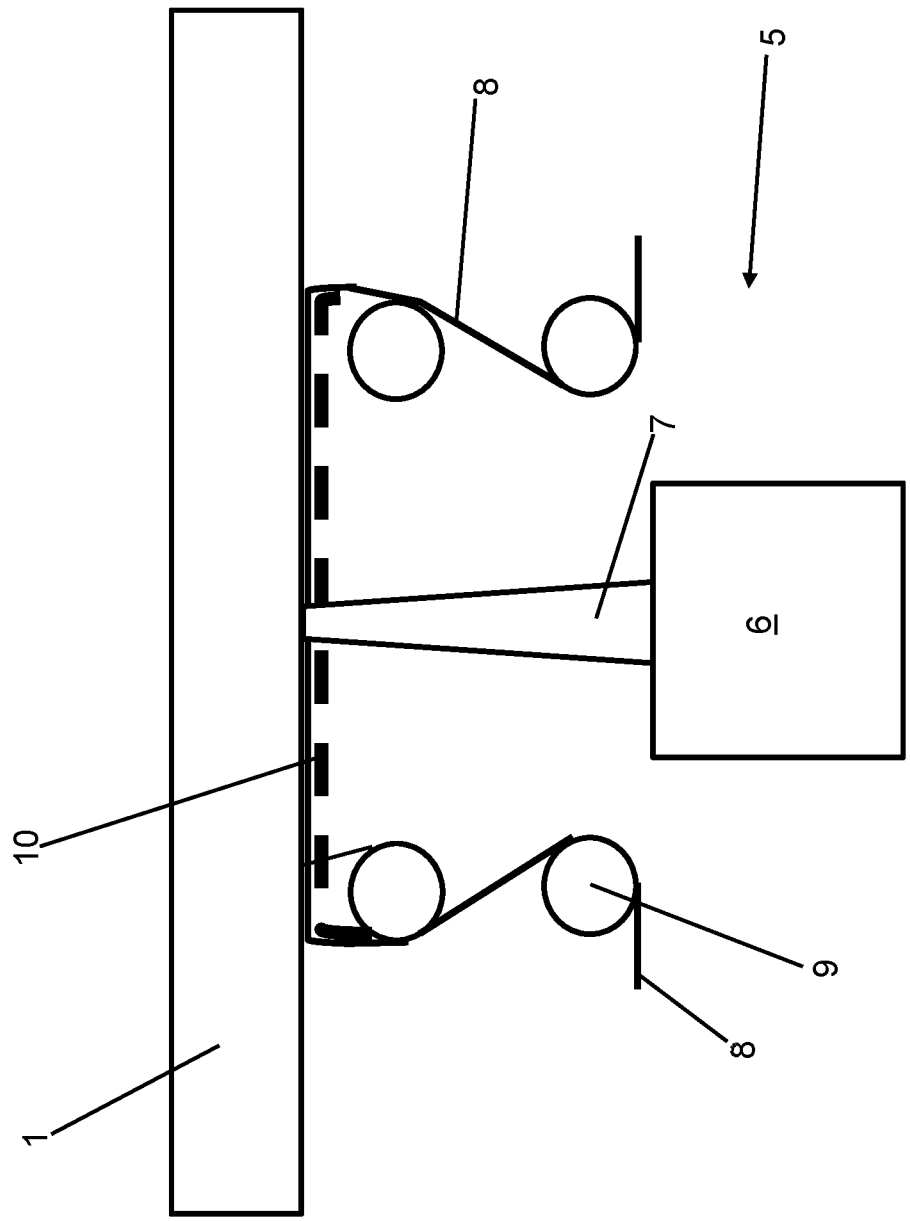

METHOD FOR MARKING GLASS PANELS, PREFERABLY SINGLE-PANE SAFETY GLASS PANELS

This application is a U.S. National Phase under 35 U.S.C. § 371 of International Application No. PCT/EP2019/058725, filed Apr. 5, 2019, which claims priority to German Patent Application No. 10 2018 207 181.0, filed May 8, 2018, the entireties of which are hereby incorporated by reference.

The present invention relates to two methods for marking glass sheets, preferably single-pane safety glass sheets.

All glass in the form of plates or sheets is referred to as flat glass, regardless of the production method used. In order to impart filtering, mirroring, heating, or other functions to flat glass sheets, a wide variety of one-layer or multilayer functional coatings are applied to the flat glass sheets. These functions may be, for example, heat protection, sun protection, or heating. In the case of low-E glass (low-E=low-emissivity=low heat radiation), one or more metallic layers reduce the degree of emission of the glass sheets, and act as heat protection and/or sun protection layers.

Generally, the functional coating is a single functional layer or a layer construction having a plurality of functional layers, having an overall thickness <2 µm. The layer construction is usually obtained through deposition processes, preferably sputtering.

Thus, the individual functional layers are usually metallic and/or ceramic layers. For example, they are metallic low-emission layers or electrical heating layers. Between the individual metallic functional layers of a functional coating, there may be situated one or more dielectric (functional) layers, e.g. made of an oxide such as aluminum oxide. In addition, an adhesive layer made of tin oxide is usually present between the functional coating and the glass surface.

In addition, for some time there have been types of glass in which the functional coating, or also only the uncoated glass surface (in glass sheets without functional coating), is protected by a peel-off protective film (TPF, temporary protective film) or a polymer protective layer (e.g. Easy-Pro® of St. Gobain), in order to protect it from possible mechanical damage. The polymer protective layer is applied for example by spraying on and cannot be peeled off, but rather is fixedly bonded to the respective surface. However, during tempering in an oven it burns off easily and without leaving a residue. Thus, in contrast to the functional coating, the protective coating is removed before the use of the glass sheet for its intended purpose.

Single-pane safety glass is made up of a single, specially heat-treated glass pane. The glass pane is heated to temperatures above its transformation temperature, and is then shock-cooled, so that a pre-stressing results in the glass pane. Preferably, the heat treatment is carried out according to DIN EN 12150-1:2015-12. Due to the pre-stressing, single-pane safety glass has increased shock and impact resistance compared to normal flat glass sheets.

At least in Germany, single-pane safety glass is subject to legally mandated labeling. Currently the labeling is usually done either using a ceramic paint, in a manual screen printing process, or using a peel-off image. The labeling is attached before the heat treatment in the oven, and is burned into the glass during the pre-stressing of the glass. The ceramic paint needs the oven temperature in order to permanently bond with the surface.

If the additional polymer protective layer is present, the labeling is applied onto the polymer protective layer in the known methods. This has the result that the labeling is removed together with the polymer protective layer. The labeling thus disappears during the heat treatment in the oven.

For this reason, single-pane safety glass sheets having a polymer protective layer currently do not satisfy the legal labeling requirement if they have been labeled using hand screen printing or a peel-off image.

In the case of the protective film, the latter is removed before the oven process and then the labeling is applied onto the functional coating using screen printing or a peel-off image.

In addition, laser marking methods for marking glass sheets without protective layers are known from the two references DE 10 2005 026 038 A1 and DE 10 2005 025 982 A1.

According to DE 10 2005 026 038 A1, a laser is used to apply a glassy layer having metallic nanoparticles onto the surface of the glass sheet. For this purpose, a donor or carrier medium is brought into contact with the glass sheet surface that is to be inscribed, and a marking is produced on the glass sheet surface by laser beam-induced processes. The carrier medium has for example a PET film that has for example a low-E functional coating, this coating having at least one metallic functional layer. For the marking, a laser beam is directed onto the functional coating, and, as a result of the laser beam irradiation, material is transferred from the functional coating of the PET carrier film onto the glass sheet surface to be marked. The material adheres on the glass sheet surface as a glassy matrix having metallic nanoparticles, the matrix being formed from the substances originally present in the functional layers of the functional coating. The PET carrier film remains undamaged.

According to DE 10 2005 025 982 A1, in a similar fashion the low-E functional coating of a glass sheet is modified in its color using laser radiation in such a way that a marking is produced.

Thus, the object of the present invention is the provision of simple and low-cost marking methods for the permanent marking of glass sheets coated with a protective coating, preferably a protective film or a polymer protective layer, in particular of single-pane safety glass sheets.

These objects are achieved by a marking method according to claim 1 and by a marking method according to claim 19. Advantageous further developments of the present invention are characterized in the subsequent subclaims.

In the context of the present invention, it was surprisingly discovered that it is possible, using laser radiation, to apply a marking onto the glass sheets, preferably provided with functional layers, under the protective coating, and to remove the protective coating in the same working step, or simultaneously.

According to the present invention, the marking can take place either according to the method of DE 10 2005 026 038 A1 or according to the method of DE 10 2005 025 982 A1.

That is, according to a first method according to the present invention, the protective coating is removed, preferably burned or burned off, by laser radiation, and in the same working step marking material from a donor or carrier medium is printed using the laser radiation onto an exposed surface of the glass sheet that was previously situated under the protective coating of the glass sheet. In glass sheets having a functional coating, the marking material is applied onto the outward-oriented functional coating surface and/or onto the glass surface. In glass sheets not having a functional coating, the marking material is applied onto the uncoated glass surface.

According to a second method according to the present invention, the protective coating is removed, preferably burned or burned off, using laser radiation, and in the same working step the color of the functional coating previously situated under it is changed, so that a marking is produced in the functional coating itself as a result of the contrast between the regions whose color has been changed and the unchanged regions.

In the following, the present invention is explained exemplarily in more detail on the basis of a drawing.

FIG. 1 shows, in highly simplified and schematic fashion, a section through a glass sheet having a protective layer, with a marking device for the second marking method according to the present invention;

FIG. 2 shows, in highly simplified and schematic fashion, a section through a glass sheet with a marking device situated under it for the first marking method according to the present invention.

A glass sheet 1 (FIG. 1, 2) to be marked according to the present invention has a first and second glass surface 1*a;b*, as well as, preferably, a circumferential glass sheet edge 1*c*. Glass sheet 1 preferably has only one individual, or single, glass pane 2 (FIG. 1). Each glass pane 2 has two glass pane surfaces 2*a;b*. If glass sheet 1 has only a single glass pane 2, then the two glass pane surfaces 2*a;b* form the glass surfaces 1*a;b* of glass sheet 1*a;b*. Particularly preferably, glass sheet 1 is a single-pane safety glass sheet having a single glass pane 2 that still has to be pre-stressed, or is already pre-stressed.

However, glass sheet 1 may also be a laminated glass sheet made up of a plurality of glass panes 2 that are bonded to one another (not shown). Laminated glass sheets are a laminate of at least two individual glass panes 2 bonded to one another by an adhesive-capable intermediate layer made of plastic, in particular by a highly tear-resistant, viscoplastic, thermoplastic film. In this case, the two externally situated glass pane surfaces 2*a;b* respectively form the glass surfaces 1*a;b* of glass sheet 1*a;b*. Glass panes 2 of the laminate glass sheet are preferably at least in part pre-stressed glass panes 2.

In addition, glass sheet 1 has a surface functional coating 3 on at least one of its two glass surfaces 1*a;b*. Functional coating 3 has an outer functional coating surface 3*a*, facing away from glass sheet or sheets 2.

Functional coating 3 can have one or more individual functional layers. If it has a plurality of functional layers, it is thus a functional layer laminate. The functional layers change particular properties of glass sheet 1, or impart particular functions to it. These functions may be, for example, heat protection, sun protection, or heating. Preferably, functional coating 3 is a wavelength-selective or low-E coating. Functional coating 3 is not removed before the use of glass sheet 1 for its intended purpose; rather, this coating is still present during the use of glass sheet 1 for its intended purpose.

Functional coating 3 of glass sheet 1 has at least one functional layer that contains metal. Preferably, such layer respectively is a metallic layer or a, preferably ceramic, metal oxide layer. The metallic functional layers are preferably embedded in oxidic functional layers, e.g. made of a metal oxide, preferably tin oxide, thus increasing transmission and durability.

Moreover, functional coating 3 can comprise a functional layer made of, preferably ceramic, metal oxide, preferably tin oxide, that is bonded directly to glass surface 1*a;b*, and that bonds the remaining layers of functional coating 3 to glass surface 1*a;b*. The functional layer of metal oxide, preferably tin oxide, thus simultaneously acts as adhesive layer.

Preferably, a functional layer containing metal, preferably a metallic functional layer, comprises silver, copper, or gold. A functional layer of metal oxide is preferably made of tin oxide.

Of course, the ceramic functional layer need not be made of oxide ceramic. It may, for example, also be a non-oxidic ceramic functional layer.

Functional coating 3 of glass sheet 1 thus has at least one metallic functional layer and/or at least one ceramic functional layer that preferably contains metal.

The application of the functional layers onto glass pane 2 is preferably done by sputtering or in a wet-chemical process.

In addition, functional coating 3 preferably has a thickness of <2 µm, preferably <1 µm.

In addition, glass sheet 1 has, on at least one of its two glass surfaces 1*a;b*, a protective coating 4 in the form of a polymer protective layer or a peel-off protective film. Protective coating 4 covers the respective glass surface 1*a;b* and functional coating 3 externally, and in particular protects functional coating 3 situated under protective coating 4, or, if no functional coating 3 is present, protects the pure glass surface 1*a;b*, from mechanical damage. Protective coating 4 thus forms the outer or external layer of glass sheet 1.

In contrast to functional coating 3, protective coating 4 is completely removed before the final use of glass sheet 1. It is therefore not permanently present. The protective film is peeled off and the polymer protective layer is burned. In contrast, functional coating 3 is permanently present at least in some regions.

The polymer protective coating is made of a polymer and cannot be peeled off from glass sheet 1. The polymer protective layer is bonded to the respective surface (functional coating surface 3*a* or glass surface 1*a;b*) fixedly or non-detachably or so that it cannot be removed without being destroyed.

In addition, the polymer protective layer preferably has a thickness from 1 µm to 1 mm, preferably 1 µm to 100 µm.

The protective film is preferably made of plastic, preferably polyvinyl chloride (PVC), and can be peeled off from glass sheet 1.

In addition, the protective film preferably has a thickness of from 20 to 100 µm.

As already explained, according to the present invention a marking is produced on glass sheet 1 either through the printing of marking material by laser radiation or through modification of the color of functional coating 3, while at the same time protective coating 4 is removed, preferably burned, in the region of the marking using the laser radiation.

FIG. 2 shows, as an example, a marking device 5 for carrying out the first marking method according to the present invention.

FIG. 1 shows, as an example, a marking device 5 for carrying out the second marking method according to the present invention.

Marking device 5 has a laser beam-producing device 6 for producing a laser beam 7. In order to carry out the first method according to the present invention, marking device 5 additionally has a donor or carrier medium 8, a plurality of guide rollers 9, and a press frame 10.

Laser beam-producing device 6 is used to remove the polymer protective layer or the protective film in the region of the marking that is to be produced, and to produce the marking in the same working step. For this purpose, laser beam-producing device 6 produces laser beam 7. For this purpose, laser beam-producing device 6 has a laser radiation source and an associated optical system. The laser beam 7 is focused by the optical system. Laser beam 7 can be pivoted or deflected from an initial position in which it is oriented vertically or perpendicular to glass surface 1*a;b*.

The laser radiation source preferably produces a laser beam 7 whose wavelength is from 190 nm to 12 µm, preferably 500 nm to 2 µm.

In addition, the laser beam source preferably produces a laser beam 7 whose laser power is <20 W, preferably <10 W, and/or is ≥0.5 W, preferably ≥5 W.

Moreover, the laser radiation source preferably produces a pulsed laser beam 7. However, it can also produce a continuous laser beam 7.

The donor or carrier medium 8 is preferably a coated plastic film, preferably made of PET. The carrier medium 8 is preferably in the shape of a strip.

In addition, carrier medium 8 has a superficial marking coating made of marking material that includes at least one metal-containing, preferably metallic, marking layer, and/or at least one ceramic marking layer.

Preferably, the metal-containing marking layer respectively is a metallic layer or a, preferably ceramic, metal oxide layer. The metallic marking layers are preferably embedded in oxidic functional layers, e.g. made of a metal oxide, preferably tin oxide.

Moreover, the marking coating can comprise a marking layer made of, preferably ceramic, metal oxide, preferably tin oxide, that is bonded directly to the surface of carrier medium 8, and that bonds the remaining layers of the marking coating to the surface. The marking layer of metal oxide, preferably tin oxide, thus simultaneously acts as adhesive layer.

Preferably, a metal-containing, preferably metallic, marking layer comprises silver, copper, or gold.

Of course, the ceramic marking layer need not be made of oxide ceramic. It may for example also be a non-oxidic ceramic marking layer.

The marking coating of glass sheet 1 thus has at least one metallic marking layer and/or at least one, preferably metal-containing, ceramic marking layer.

The application of the marking layers onto carrier medium 8 preferably takes place by sputtering or in a wet-chemical process.

The marking coating is advantageously a low-E coating.

In addition, the marking coating preferably has a thickness of <5 µm.

Press frame 10 is used to press strip-shaped carrier medium 8 onto glass sheet 1 to be marked. Press frame 10 is preferably transparent for the laser radiation. Alternatively, press frame 10 has an opening that exposes the marking region.

Strip-shaped carrier medium 8 is in addition led around guide rollers 9.

For the marking, carrier medium 8 is pressed, with its side coated with the marking coating, onto glass sheet 1 by press frame 10. Then, using laser beam 7 focused onto the marking coating, marking material is transferred from the marking coating onto glass sheet 1, in particular onto functional coating surface 3*a* and or glass surface 1*a;b*, and is fixed thereon. Due to the fact that the laser radiation is absorbed by the marking material, this material is detached from carrier medium 8 and is conveyed onto surface 1*a;b*; 3*a* to be marked.

Simultaneously, or in the same working step, according to the present invention protective coating 4 is removed, in particular burned, by laser beam 7 in order to expose surface 1*a;b*; 3*a* to be marked.

Both the material of press frame 10 and also that of carrier medium 8 are extremely weakly absorbent at the laser wavelength of laser beam 7, so that laser beam 7 passes through carrier medium 8 and press frame 10.

For the marking, glass sheet 1 and laser beam 7, and if applicable carrier medium 8, must be moved relative to one another, parallel to glass surfaces 1*a;b*. Preferably, only laser beam 7 is moved. The movement of laser beam 7 preferably takes place using the optical system of laser beam-producing device 6. That is, using two adjustable mirrors (scanning optics), the optical system of laser beam-producing device 6 is preferably capable of moving laser beam 7 in a region of e.g. 100 mm×100 mm (scanning field). After the marking, strip-shaped carrier medium 8 is then advanced.

The marking thus takes place by introducing burn traces or laser traces into protective coating 4, and transferring marking material out of the marking coating from carrier medium 8 onto glass sheet 1, in particular onto functional coating surface 3*a* and/or glass surface 1*a;b*. The laser traces may be in the shape of points, lines, or surfaces. In the region of the laser traces, protective coating 4 is completely removed, in particular vaporized or burned, and the marking material is applied onto the thereby exposed surface 1*a;b*, 3*a*.

As already stated, in the second method according to the present invention the marking takes place by introducing burn traces or laser traces into protective coating 4 and functional coating 3. In the region of the laser traces, protective coating 4 is completely removed, in particular vaporized or burned, and the color of functional coating 3 is changed.

The cause of the color changes is, inter alia, the absorption of the laser radiation in the metallic or ceramic functional layer. This layer is heated by the absorption so strongly that in the irradiated region there is a change in the material of the functional coating. As a consequence of the change, for example the metal is present in the form of nanoparticles embedded in a matrix, formed at least partly of material from the other functional layers originally present in functional coating 3. Or the chemical structure of the material is changed in such a way that its color changes.

These mechanisms, or the resulting color changes, usually also occur in the marking material of the marking coating of the carrier medium.

An advantage of the methods according to the present invention is that also single-pane safety glass sheets having a protective coating 4 can be permanently marked. The not yet pre-stressed glass sheets 1 can be marked, and the marking will be retained despite the burning off of the polymer coating during the heat treatment. As a result, test markings can also be applied that, through a change of color, indicate that the required time for the temperature treatment has been reached.

In addition, single-pane safety glass sheets that are already pre-stressed, and that have a protective film, can also be marked.

The markings produced according to the present invention have a high degree of resistance against abrasion and weather influences, as well as temperatures, solvents, or other chemicals. As a result, an optimal marking is ensured over the entire lifetime of glass sheet 1.

Marking device 5 for carrying out one of the two methods according to the present invention can easily be integrated into cutting and break lines, or can be designed as a single-position system. For example, the marking device can be integrated into the cutting bridge.

In addition, with the method according to the present invention a fully automatic labeling with machine-readable codes (e.g. data matrix codes), logos and product IDs, serial numbers, and order-specific data can be carried out individually for each glass sheet.

In this context, it was not easily foreseeable that the application of a marking on a surface 1a;b; 3a situated underneath protective coating 4 is possible. The laser radiation is absorbed by the marking coating, in particular by the marking layer or layers. As a result, the marking coating, in particular the marking layer(s), is or are dislodged at least partly, or in partial quantities, from carrier medium 8. It is now assumed that the energy thereby released has the surprising result that protective coating 4 is removed, thus exposing the surface to be marked. Apparently, temperatures are reached that result in the burning off of the protective coating, similar to the oven process. In contrast, the marking material, or the material of the functional layers, cannot burn, because it is a metal or a ceramic.

It is also within the scope of the present invention that carrier medium 8 is at a distance from glass sheet 1 during the irradiation. It was determined that even at a distance of 150 μm, markings can still be produced. In each case, the coated side of carrier medium 8 faces towards glass sheet 1.

In addition, laser beam 7 can also be directed onto the marking coating, or functional coating 3, through glass sheet 1. This facilitates the integration of the laser labeling in the flow of work during the charging of the oven.

EXEMPLARY EMBODIMENTS

A 1 μm laser was directed onto the coated glass surface of a single-pane safety glass sheet provided with a polymer protective layer. The single-pane safety glass sheet additionally had a low-E coating having a silver layer. The laser power was 5 W. The frequency of the pulsed laser beam was 10 kHz. The beam diameter at the focus was 100 μm.

A permanent marking was produced in the low-E coating, and the polymer protective layer was removed in the region of the marking.

Using the same laser, a marking was also made on the glass sheet using a marking strip. For this purpose, the marking strip was pressed onto the polymer protective layer. The marking strip also had a low-E coating. The laser was also focused onto the coated glass surface.

A permanent marking was also produced on the glass sheet, and the polymer protective layer was removed in the region of the marking.

The invention claimed is:

1. A marking method for marking glass sheets that comprise at least on one of their two glass surfaces a protective coating in the form of a polymer coating or in the form of a peel-off protective film, comprising the acts of:
   a) providing a carrier medium that has a superficial marking coating made of marking material having at least one metal-containing and/or at least one ceramic marking layer,
   b) removing the protective coating in the region of the marking to be applied, using laser radiation, and, simultaneously, transferring of marking material of the marking coating of the carrier medium, in the form of the marking to be applied, onto the surface exposed by the removing of the protective coating, using the laser radiation.

2. The marking method according to claim 1, wherein the laser radiation is generated using a laser beam having a wavelength of from 190 nm to 12 μm and/or having a laser power <20 W.

3. The marking method according to claim 1, wherein the laser radiation is generated using a pulsed laser beam.

4. The marking method according to claim 1, wherein not yet pre-stressed single-pane safety glass sheets are marked.

5. The marking method according to claim 1, wherein the glass sheets to be marked comprise a functional coating, situated under the protective coating, having at least one metallic functional layer and/or at least one ceramic metal oxide functional layer.

6. The marking method according to claim 5, wherein the functional coating is a low-E coating.

7. The marking method according to claim 1, wherein the protective coating is the polymer coating made of a polymer and cannot be peeled off from the glass sheet,
   wherein the polymer coating has a thickness of 1 μm to 1 mm.

8. The marking method according to claim 1, wherein the protective coating is the protective film made of plastic, and can be peeled off from the glass sheet,
   wherein the protective film has a thickness from 20 to 100 μm.

9. The marking method according to claim 1, wherein the laser radiation is radiated through the glass sheet.

10. The marking method according to claim 1, wherein a focused laser beam is used.

11. The marking method according to claim 10, wherein the laser beam is focused onto the glass surface with the protective coating.

12. The marking method according to claim 1, wherein the marking material is applied onto an outward-facing functional coating surface of afunctional coating situated under the protective coating, having at least one metal-containing and/or at least one ceramic functional layer, and/or onto the glass surface.

13. The marking method according to claim 1, wherein the metal-containing marking layer is a metallic layer or a ceramic, metal oxide layer.

14. The marking method according to claim 1, wherein the marking coating is a low-E coating.

15. The marking method according to claim 1, wherein the laser radiation is absorbed by the marking coating in such a way that the marking material is dislodged from the carrier medium and is conveyed onto the surface that is to be marked.

16. The marking method according to claim 15, wherein the protective coating is removed by the energy released during the dislodging.

17. The marking method according to claim 1, wherein the carrier medium lies on the glass sheet during the laser irradiation.

18. The marking method according to claim 1, wherein during the laser irradiation, the side of the carrier medium coated with the marking coating is oriented toward the glass sheet.

19. The marking method according to claim 1, wherein the carrier medium is provided in the form of a strip-shaped carrier film.

* * * * *